United States Patent
Wiser, III et al.

(10) Patent No.: US 6,902,603 B2
(45) Date of Patent: Jun. 7, 2005

(54) INTEGRATED AIR FILTRATION UNIT

(75) Inventors: Forwood Cloud Wiser, III, Kingston, NJ (US); George Robert Summers, Carleton Place (CA)

(73) Assignee: Engineering Dynamics Ltd., Ontario (CA)

( * ) Notice: Subject to any disclaimer, the term of this patent is extended or adjusted under 35 U.S.C. 154(b) by 0 days.

(21) Appl. No.: 10/351,896

(22) Filed: Jan. 27, 2003

(65) Prior Publication Data

US 2004/0144254 A1 Jul. 29, 2004

(51) Int. Cl.$^7$ .................................................. B03C 3/016
(52) U.S. Cl. ............................. 96/16; 55/493; 55/506; 55/DIG. 31; 96/66; 96/224; 422/24; 422/121
(58) Field of Search .................... 96/16, 224, 66, 96/67; 55/493, 521, 506, DIG. 12, DIG. 31; 422/24, 121

(56) References Cited

U.S. PATENT DOCUMENTS

| | | | | |
|---|---|---|---|---|
| 1,937,483 A | * | 11/1933 | Shurtleff | 454/205 |
| 2,044,221 A | * | 6/1936 | Myers et al. | 55/483 |
| 3,249,228 A | * | 5/1966 | Arvanitakis | 210/184 |
| 3,520,115 A | * | 7/1970 | Bowen | 55/422 |
| 3,691,736 A | * | 9/1972 | Neuman | 55/484 |
| 4,193,780 A | * | 3/1980 | Cotton et al. | 55/378 |
| 4,886,526 A | * | 12/1989 | Joannou | 96/67 |
| 5,330,722 A | | 7/1994 | Pick et al. | 422/121 |
| 5,512,074 A | * | 4/1996 | Hanni et al. | 55/484 |
| 5,656,242 A | * | 8/1997 | Morrow et al. | 96/224 |
| 5,837,207 A | | 11/1998 | Summers | 422/121 |
| 6,221,314 B1 | * | 4/2001 | Bigelow | 422/24 |
| 6,294,004 B1 | | 9/2001 | Summers et al. | 96/66 |
| 6,589,323 B1 | * | 7/2003 | Korin | 96/223 |
| 6,623,538 B2 | * | 9/2003 | Thakur et al. | 55/385.2 |
| 2002/0100878 A1 | | 8/2002 | Summers et al. | |

OTHER PUBLICATIONS

TRANE brochure; Rooftop Single Packaged Unites; 1997; pp. 1–16.

* cited by examiner

*Primary Examiner*—Richard L. Chiesa
(74) *Attorney, Agent, or Firm*—James W. Kayden; Thomas, Kayden, Horstemeyer & Risley, LLP

(57) ABSTRACT

An integrated air filtration unit includes a support structure for mounting a V-shaped filter bank to an air passage of an air handling system. The V-shaped filter bank may be moved from a working position in which the air is filtered to a service position in which a pair of filter pads in the filter bank can be accessed for service or replacement. The integrated air filter unit may include an ultraviolet irradiation system for destroying airborne micro-organisms trapped by the pair of filter pads.

16 Claims, 5 Drawing Sheets

INTEGRATED AIR FILTRATION UNIT

TECHNICAL FIELD

The present invention relates to air filtration systems, and more particularly to an integrated air filtration unit that incorporates an irradiation device into a V-bank electrostatic filter structure, which can be easily removed from an air handling system for maintenance and air filter replacement.

BACKGROUND OF THE INVENTION

Public awareness of environmental issues has steadily increased in recent years. As a result, the general public now demands a quality environment with clean air in which to live, work and entertain. Various types of air filtration systems are used in residential and commercial buildings to improve the quality of the air. One commonly used filter configuration for commercial applications is a "IV-bank" arrangement of planar air filters, because the V-bank provides twice the filter area of a planar air filter in the same air passage.

Electrostatic V-bank air filters are constructed from a pair of electrostatic air filters supported by V-shaped side panels installed in an air-handling system. The pair of air filters share the air cleaning load of air drawn through an air intake at a wide end of the V-shaped side panels. Because of their air cleaning efficiency and ease of maintenance, there is a rapidly increasing demand for electrostatic V-bank air filters. They have become particularly popular in public places with significant air quality problems, such as casinos and bars, where cigarette smoke is of particular concern. They are also gaining acceptance in animal husbandry where they are used for odor and/or disease control in livestock and poultry housing. They are also expected to gain acceptance in office, small commercial buildings and residential buildings and private homes, where they can contribute to air quality.

An example of electrostatic V-shaped filter banks is described in the Applicant's U.S. Pat. No. 6,294,004 which issued on Sep. 25, 2001. The V-bank air filters are assembled from two side panels, perforated top and bottom plates, a narrow end wall and include an open wide end for the intake of air to be filtered. A pair of enclosure plates are pivotally mounted to the side panels in a parallel relationship with the respective top and bottom plates in order to form a pair of rectangular enclosures for respectively supporting electrostatic filter pads. The enclosure plates pivot open for removal and replacement of the filter pads. The side panels, top and bottom plates and rear wall are made from sheet metal blanks using cutting, bending and stamping processes. Mounting peripheral edges are provided at the open wide end for installation of the structure within an air handling system. When used in large air handling systems for commercial buildings which usually include ducts sized for walk-in maintenance, this V-shaped filter bank is easy to install, and maintain. However, installation and maintenance of these V-bank electrostatic air filters in residential and small commercial air handling systems is not straightforward and may require extensive modification to an air handling system.

In another aspect of air filtration technology, the airborne transmission of disease organisms, especially respiratory disease organisms, has long been recognized as a serious problem. Health care authorities and biologists have now become acutely aware of the problem with the evolution of antibiotic-resistant strains of Streptococcus and Tuberculosis, for example. It is well known that many diseases caused by both bacteria and viruses are primarily transmitted from host to host by air currents. Therefore, germicidal air filters have been invented and have proven to be effective in removing micro-organisms from the air and destroying them. Examples of such filters are described in U.S. Pat. No. 5,330,722 which issued on Jul. 19, 1994 to Pick and has subsequently been assigned to the Applicant. The germicidal air filtration systems described in that patent are principally suitable for permanent or semi-permanent installations.

As another example, a portable germicidal air filter is described in U.S. Pat. No. 5,837,207 which issued on Nov. 17, 1998 to Summers and is also assigned to the Applicant. The light-weight portable germicidal air filter for home and personal use described in that patent includes a cabinet that houses an electrostatic air filter, and ultraviolet lamp with a parabolic reflector or a convex lens for focusing the ultraviolet radiation emitted by the lamp onto the upstream side of the air filter. The reflector or the lamp with the lens is constantly oscillated to systematically sweep the upstream side of the filter with germicidal levels of radiation. A fan adjacent the downstream side of the filter draws air through the filter and impels it out through air outlets in the side walls of the cabinet.

A further example of an irradiation unit is described by Summers in United States patent application publication no. US2002/100878, published on Aug. 1, 2002. The irradiation unit includes an adapter that accepts a frame for supporting an ultraviolet lamp with a reflector or a lens, for focusing the radiation on a surface. The unit may include a housing secured to one end of the frame, containing a drive motor and a cam assembly which oscillate the reflector if the radiation is to be focused on a predefined area of the surface at any given time. The unit can be quickly mounted in any orientation to practically any flat surface.

While all of these options exist, there is no known commercially available integrated air filtration unit that is adapted for use in small commercial and residential air handling systems that provides excellent air filtration with low air flow resistance and germicidal air treatment.

There is therefore a need for an integrated air filtration unit that can be easily installed or retrofitted in an air handling system used for residential or small commercial buildings, is easily serviced, and combines the benefits of both a germicidal irradiation and electrostatic air filtration system.

SUMMARY OF THE INVENTION

It is therefore an object of the invention to provide an integrated air filtration unit adapted to be easily and rapidly installed in a new or existing air handling system, has a high air filtration capacity, and is convenient to maintain.

It is a further object of the invention to provide an integrated air filtration unit that combines a germicidal irradiation system with electrostatic air filters having a high air filtration capacity.

In accordance with one aspect of the invention there is provided an integrated air filtration unit comprising a substantially V-shaped filter bank having an open top end, a closed bottom end, front and rear walls that are parallel to each other, and at least one pair of air filter pads removably supported between the top and the bottom ends and between the front and the rear walls, thereby defining a space between each pair of filter pads having a substantially triangular cross-section. The integrated air filtration unit further comprises a support structure adapted to be mounted in fluid communication with an air passage of an air handling system, so that in a working position air moved by the air handling system is passed through the pair of filter pads in either of a first direction in which the air flows through the at least one pair of filter pads to the space between the at least one pair of air filter pads, and a second direction in which air flows from the space and through the at least one pair of air filter pads. The support structure is further adapted to slidably support the substantially V-shaped filter bank to permit the V-shaped filter bank to be pulled out of the support structure to a service position in which the pair of filter pads can be accessed for servicing or replacement.

The support structure preferably comprises locking mechanisms for releasably locking the substantially V-shaped filter bank in the working position.

The filter pads are preferably electro-statically charged filter pads, and an irradiation unit is preferably mounted to the front wall of the substantially V-shaped filter bank and extends into the space between the air filter pads in order to irradiate the respective electro-statically charged filter pads with ultraviolet radiation. The irradiation unit includes for example, an elongate frame for supporting an elongate radiation source that extends parallel to the electrostatic filter pads and across the space defined within the unit. A housing is secured to one end of the frame and a support bracket is secured to a front surface of the front wall of the substantially V-shaped filter bank for receiving the housing in order to support the frame when the frame extends into the space within the unit through the front wall. The irradiation unit is also preferably adapted to focus the radiation in a narrow band that is systematically swept over the respective electrostatic filter pads.

In one embodiment of the present invention the support structure includes front and rear beams and a pair of side beams. The support structure further includes a support element, for example a flange that extends inwardly from each of the side beams for slidably supporting weight-bearing flanges on top side edges of the substantially V-shaped filter bank unit. Mounting flanges extend outwardly from an upper edge of the respective front, rear and side beams. The mounting flanges are positioned substantially in a plane such that the mounting flanges facilitate mounting to a periphery of an air passage of the air handling system.

In another embodiment of the present invention, the support structure comprises a housing that includes a pair of side walls and a rear wall. The housing has an open top end, an open bottom end and an open front side. The open top and bottom ends further include a flanged periphery to facilitate installation of the housing in an air passage of the air handling system. A support beam extends between the front end and the rear wall of the housing, and is attached to the flanged periphery of the open bottom end for slidably supporting the substantially V-shaped filter bank in the working position within the housing. The front wall of the substantially V-shaped filter bank is shaped and sized substantially in accordance with the front opening of the housing in order to close the housing when the substantially V-shaped filter bank is in the working position within the housing.

In a further embodiment of the present invention, the support structure comprises a roof top curb that supports the V-shaped filter bank unit and support structure. The roof top curb has an air passage therethrough supports the substantially V-shaped filter bank within the air passage. The roof top curb includes an access door to permit the substantially V-shaped filter bank to be moved to the service position.

The integrated air filtration unit provides a high capacity air filter with effective germicidal irradiation. It is also easy and convenient to maintain and can be retrofitted to existing air handling systems. The integrated air filtration system is particularly well adapted for use in residential and small commercial air handling systems.

Other advantages and features of the present invention will be better understood with reference to preferred embodiments described hereinafter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides an integrated air filtration unit that includes a substantially V-shaped filter bank having an open top end, a closed bottom end, front and rear walls that are parallel to each other, and at least one pair of air filter pads removably supported between the top and the bottom ends and between the front and the rear walls, thereby defining a space between the respective pair(s) of filter pads having a substantially triangular cross-section. A support structure for the V-shaped filter bank is adapted to be mounted in fluid communication with an air passage of an air handling system so that in a working position air moved by the air handling system is passed through the pair of filter pads in either of a first direction in which the air flows through the pair of filter pads to the space between the pair of filter pads, and a second direction in which air flows from the space and through the pair of filter pads. The support structure is also adapted to slidably support the substantially V-shaped filter bank to permit the V-shaped filter bank to be pulled out of the support structure to a service position in which the pair of filter pads can be accessed for servicing or replacement.

Figure 1:
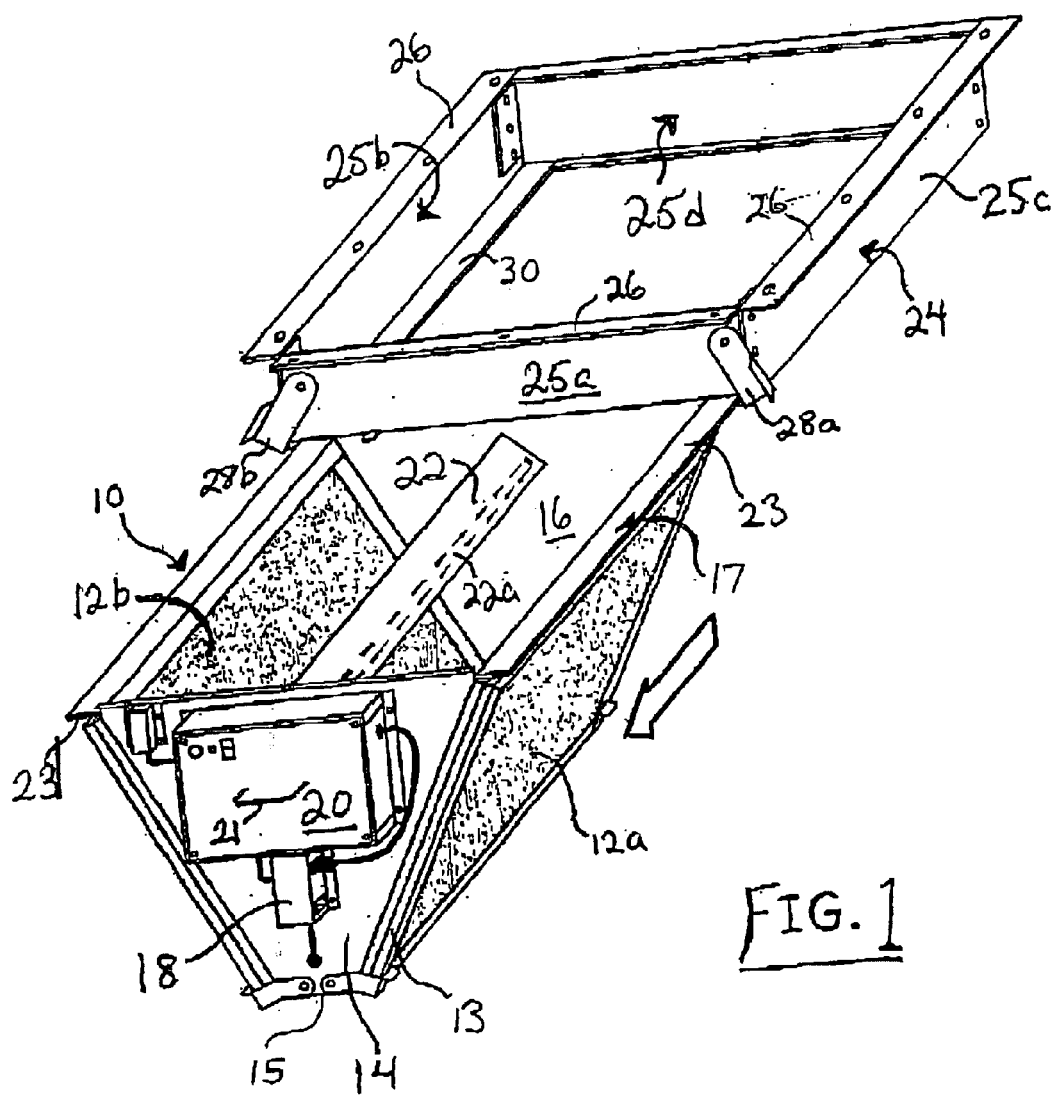
FIG. 1 schematically illustrates a V-shaped filter bank and a support structure in accordance with the invention.

FIG. 1 illustrates a view of a V-shaped filter bank 10 in accordance with one embodiment of the invention. The V-shaped filter bank 10 includes two fibrous filter pads 12a,b that are supported in frames 13 secured to a bottom panel 15, a front wall 14, a rear wall 16 having the same size and shape as the front wall 14, and a top beam 17 that interconnects the front wall 14 and rear wall 16. The respective fibrous filter pads 12a,b are captively supported in the frames 13 of the V-shaped filter bank 10 without interrupting airflow across the filter pads 12a,b, in a manner well known in the art. Frames 13 suitable for use in an embodiment of the instant invention, are described in detail in Applicant's U.S. Pat. No. 6,294,004 for a low-cost efficient structure for supporting electrostatic air filters in a V configuration, entitled STRUCTURES FOR ELECTROSTATIC V-BANK AIR FILTERS, the specification of which is incorporated herein by reference.

The front wall 14 supports a power supply unit 18, and an irradiation control system 20. The power supply unit 18 is adapted to receive electrical power from an alternating current (AC) source, and supplies operating power to both filter pads 12a,b, which are, in accordance with the illustrated embodiments, electro-statically charged fibrous air filter pads. In a manner well known in the art, the AC current is transformed and supplied to induce a significant electrical potential (3–10 Kv) across at least a portion of each of the filter pads 12a,b. The electrical potential polarizes the fibers of the filter pads 12a,b, in a manner well known in the art. In some embodiments an electrostatic charging medium embedded within each of the electrostatic filter pads 12a,b provide one of the electric fields required to induce the polarizing effect, and perforated, conductive plates or screens that support the filter pads 12a,b provide the other (s).

The power supply unit 18 also supplies power to the irradiation control system 20. Applicant's co-pending patent application Ser. No. 09/770,700 filed on Jan. 2, 2001 and published under publication number 2002/0100878 on Aug. 1, 2002, discloses a germicidal irradiation system that can sweep across the filter pads 12a,b and thereby destroy at least a portion o the micro-organisms trapped by the fibrous filter pads 12a,b. Accordingly an elongated ultraviolet radiation source 22a partially covered and supported by an irradiation unit 22 is operatively coupled to the irradiation control system 20. The irradiation unit 2 may be supported by both the front 14 and rear 16 panels. The irradiation system may provide continuous irradiation across the filter pads 12a,b, or may sweep a focused band of ultraviolet radiation across the filter pads at a predefined rate. A proximal end of the irradiation control system 20 includes a handle 21 that can be used to insert or remove the V-shaped filter bank unit 10 from a support structure, as will be explained below in detail.

The irradiation unit 22 preferably includes a housing for the irradiation control system 20 secured to the front wall 14, a support bracket for mounting the housing to the front wall 14, and an elongated ultraviolet lamp 22a that extends a length of a substantially triangular space defined by the air filter pads 12a,b.

In accordance with the invention, the V-shaped filter bank unit 10 is designed to be moved from an operating position in an air duct of an air handling system to a service position in which the filter pads 12a,b are accessible for maintenance or replacement. In the embodiment shown in FIG. 1, the top beam 17 includes two outwardly extending, weight-bearing flanges 23 that extend along a top outer edge of the respective top beams 17. A support structure 24 for supporting the V-shaped filter bank unit 10 receives the weight-bearing flanges 23. The support structure 24 includes four beams 25a,b,c,d secured together at respective ends by screw or rivet fasteners in a manner well known in the art. The respective beams include out-turned top edges, which form flanges 26 that permit the V-shaped filter bank unit to be mounted to an air duct of an air handling system, as will be explained below in more detail. The flanges 26 preferably include spaced-apart bores through which screw fasteners may be inserted for mounting the support structure 24 to the air duct.

A bottom edge of the side beams 25b,c of the support structure 24 include inwardly extending support elements 30 that provide a horizontal slot for slidably receiving the weight-bearing flanges 23 of the substantially V-shaped filter bank unit 10. The support elements 30 are spaced slightly below the front beam to permit the weight-bearing flanges 23 to be inserted into or removed from the support structure 24. The V-shaped filter bank unit 10 can therefore be reciprocated from the operational or working position to a service position in which the V-shaped filter bank unit is, for example, completely removed from the support structure 24 so that the filter pads 12a,b are accessible for maintenance or replacement. Depending on the configuration of the filter pad support frames 13, the V-shaped filter bank unit 10 may be turned upside down and rested on its top edge while the filter pads 12a,b are serviced.

Locking mechanisms 28a,b are provided for locking the V-shaped filter bank unit 10 in the working position. The locking mechanisms 28a,b in this embodiment include two latches 28a,b pivotally mounted to opposite ends of the front beam 25a of the support structure 24, so that when in the working position the two latches 28a,b extend below a top edge of the front wall 14, to lock V-shaped filter bank unit 10 in the working position. As will be understood by persons skilled in the art, many alternate locking mechanisms can be utilized for the same purpose.

Figure 2:
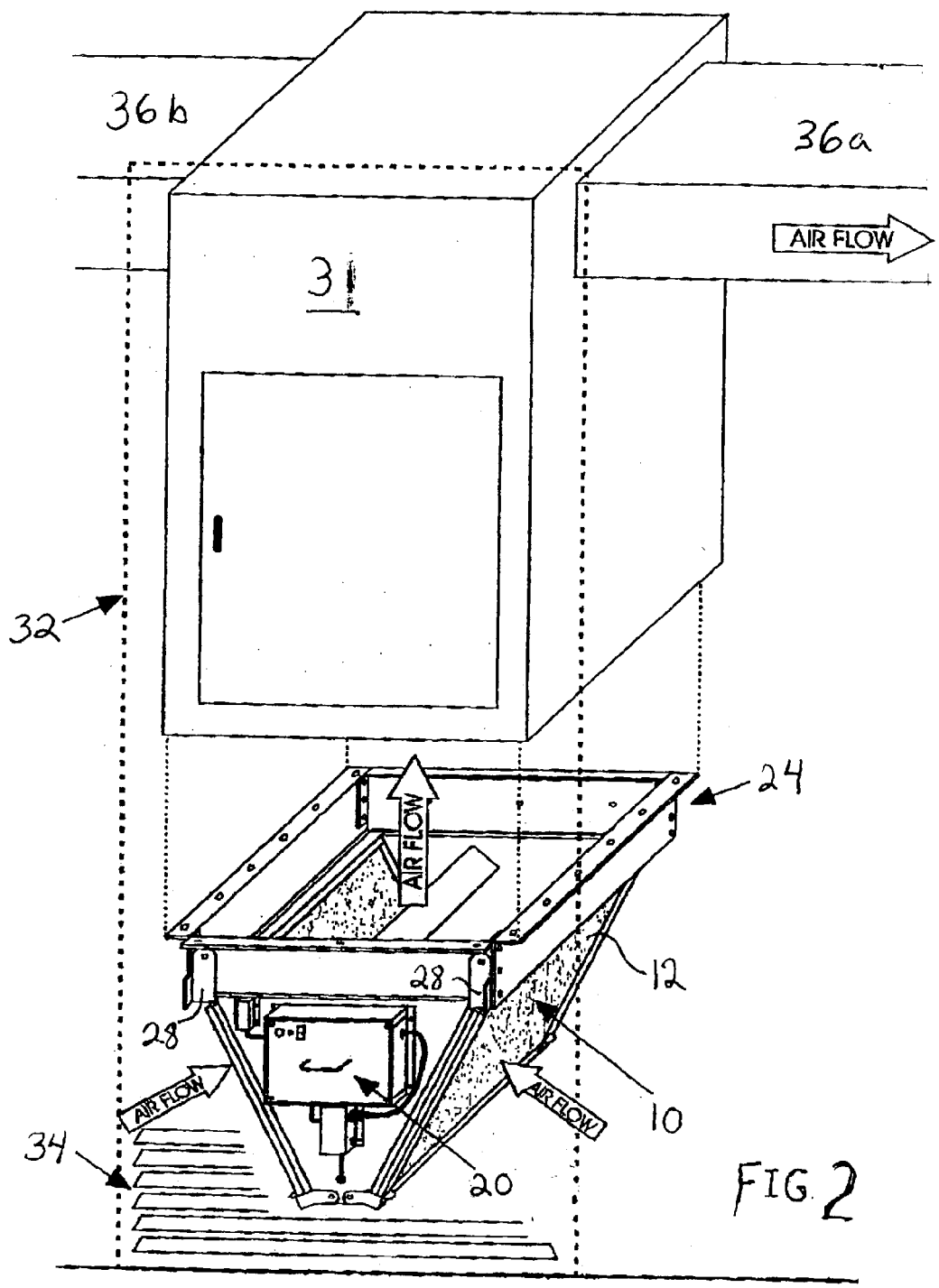
FIG. 2 schematically illustrates a view of the V-shaped filter bank and support structure shown in FIG. 1 in a first exemplary installation environment.

FIG. 2 shows an exemplary air handling system in which the integrated air filtration unit in accordance with the invention may be installed. A forced-air closet furnace 31, widely used in climates where heating demands are moderate, has an open bottom en designed for cold air intake, in a manner well known in the art. A bottom of a door 32 of the closet has a ventilation grill 34 for permitting old return air to flow into the closet and up through the air intake at the bottom of the forced-air furnace 31. In this way the cold return air i heated by the forced-air furnace and exits the forced-air furnace 30 through hot air ducts 36a,b. In accordance with the invention, the support structure 24 is secured to the bottom of the forced air furnace 31, so that the cold return air drawn into the air intake of the forced-air furnace 30 is drawn through the filter pads 12a,b of the V-shaped filter bank 10, and into the furnace 31.

In order to replace the electrostatic air filter pads 12a,b, a user only needs to open the closet door, unplug the power supply 18, pivot the locking mechanisms 28a,b to the unlocked position (which are designed to remain in either of the unlocked and locked positions), pull out the V-shaped filter bank 10, and then remove and replace the electrostatic air filter pads 12a,b. The process of removing and replacing the air filter pads 12a,b may depend on the specific construction of the frames 13. As noted above, the V-shaped filter bank unit 10 may be inverted and supported on its top end to facilitate replacement of the filter pads 12a,b. The above-noted steps are reversed to return the V-shaped filter bank unit 10 to the working position.

Figure 3:
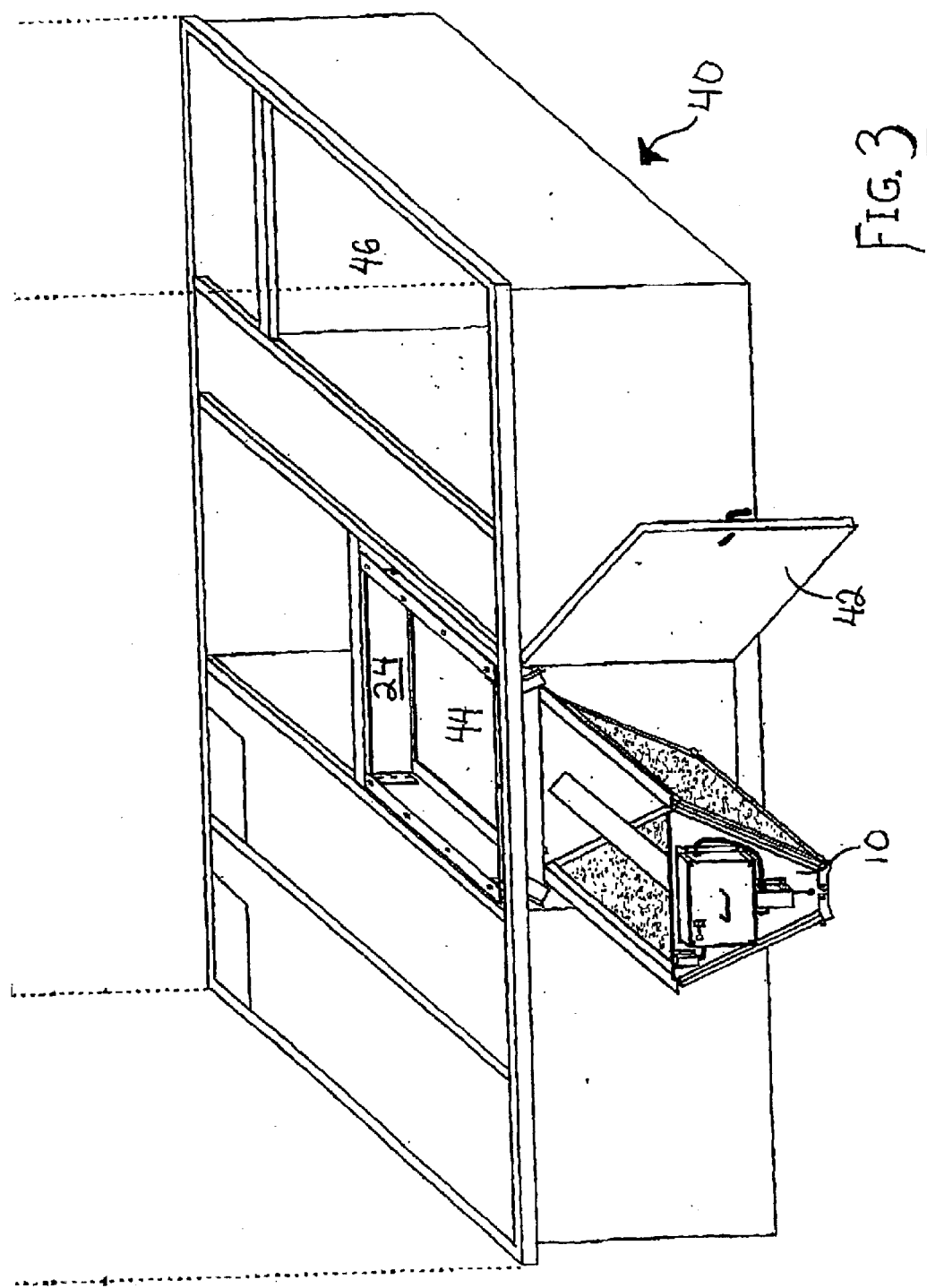
FIG. 3 schematically illustrates a view of the V-shaped filter bank and support structure shown in FIG. 1 in an alternative installation environment, in which the V-shaped filter bank is mounted to a roof-top curb of an air handling system.

An alternative air handling system to which the support structure 24 may be mounted for receiving the V-shaped filter bank unit 10 is schematically illustrated in FIG. 3. The air handling system is a roof-top air handler that performs air handling for a building, in a manner that is well known in the art. In accordance with the invention, a curb 40 for sealed coupling of air conduits (usually ducts) of the building below to the roof-top air handler, is of a height sufficient to receive the V-shaped filter bank unit 10. The support structure 24 is secured to an inside of an air passage 44. Usually at least two air passages are provided, at least one for receiving air returned from the building (46), and at least one for supplying air to the building. Preferably the air passage chosen to receive the support structure 24 serves as an air supply for the building, for example as an air intake to a heat exchanger of the building below. As shown, the V-shaped filter bank unit 10 is installed for easy access via a door 42 provided in the curb 40.

Figure 4:
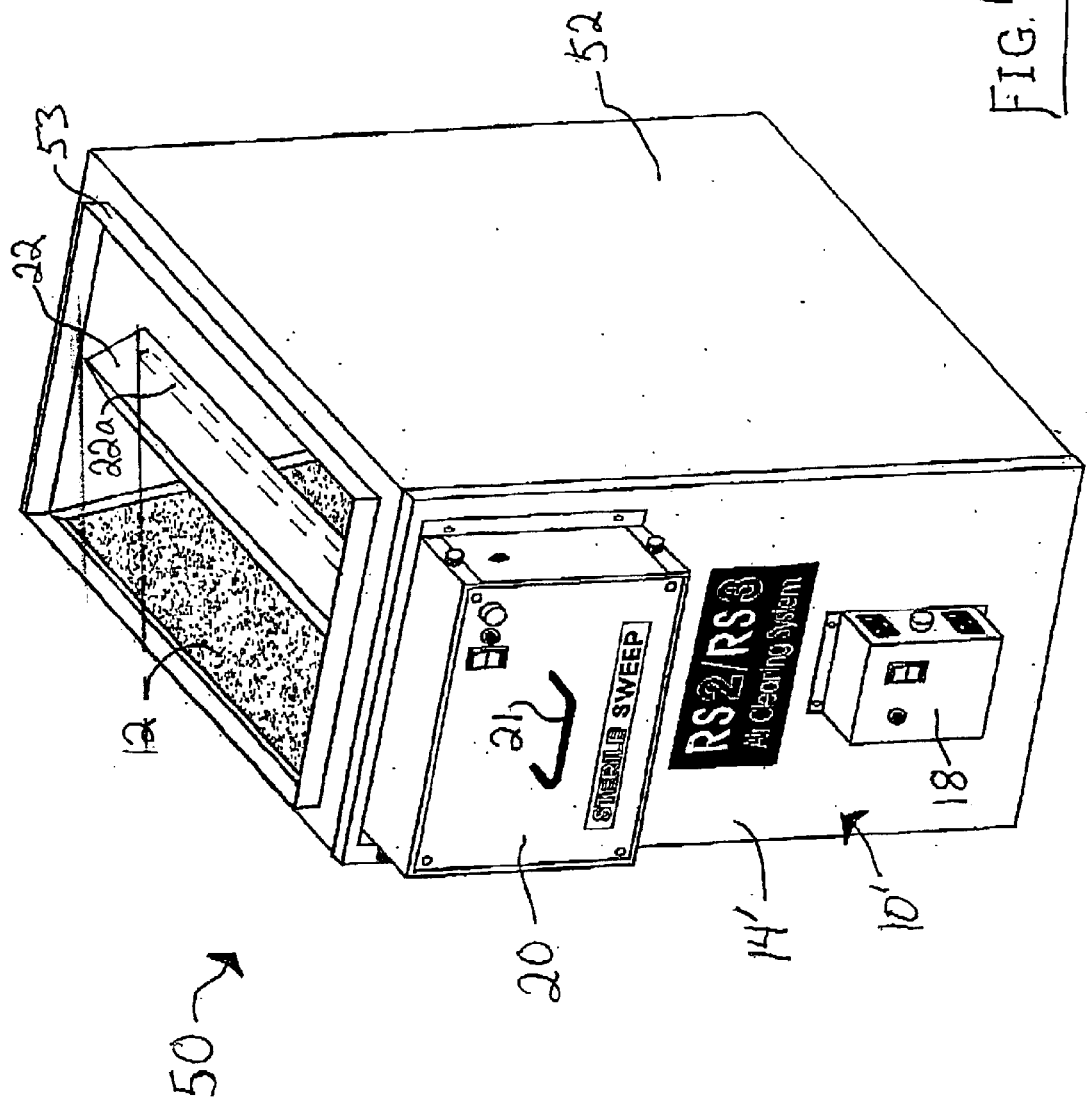
FIG. 4 schematically illustrates a view of a V-shaped filter bank and support structure in accordance with the invention for mounting between a cold-air return duct and an air intake of an air handling system.

Another embodiment of an integrated air filtration unit 50 in accordance with the invention is illustrated in FIG. 4. The second embodiment is adapted to be connected in fluid communication with a cold air return duct of an air handling system such as a heating, ventilation and cooling (HVAC) system, or a forced-air furnace, for example. While the principal air filtering components of the embodiment illustrated in FIG. 4 are the same as those of the V-shaped filter bank unit 10 shown in FIG. 1, in accordance with the second embodiment, the support structure is a housing 52 having open top and bottom ends. The top end of the housing 52 includes flanges 53 to facilitate connection to an air flow passage, in a manner well known in the art. The housing 52 removably secures the V-shaped filter bank unit 10, as will be explained below with reference to FIG. 5.

Figure 5:
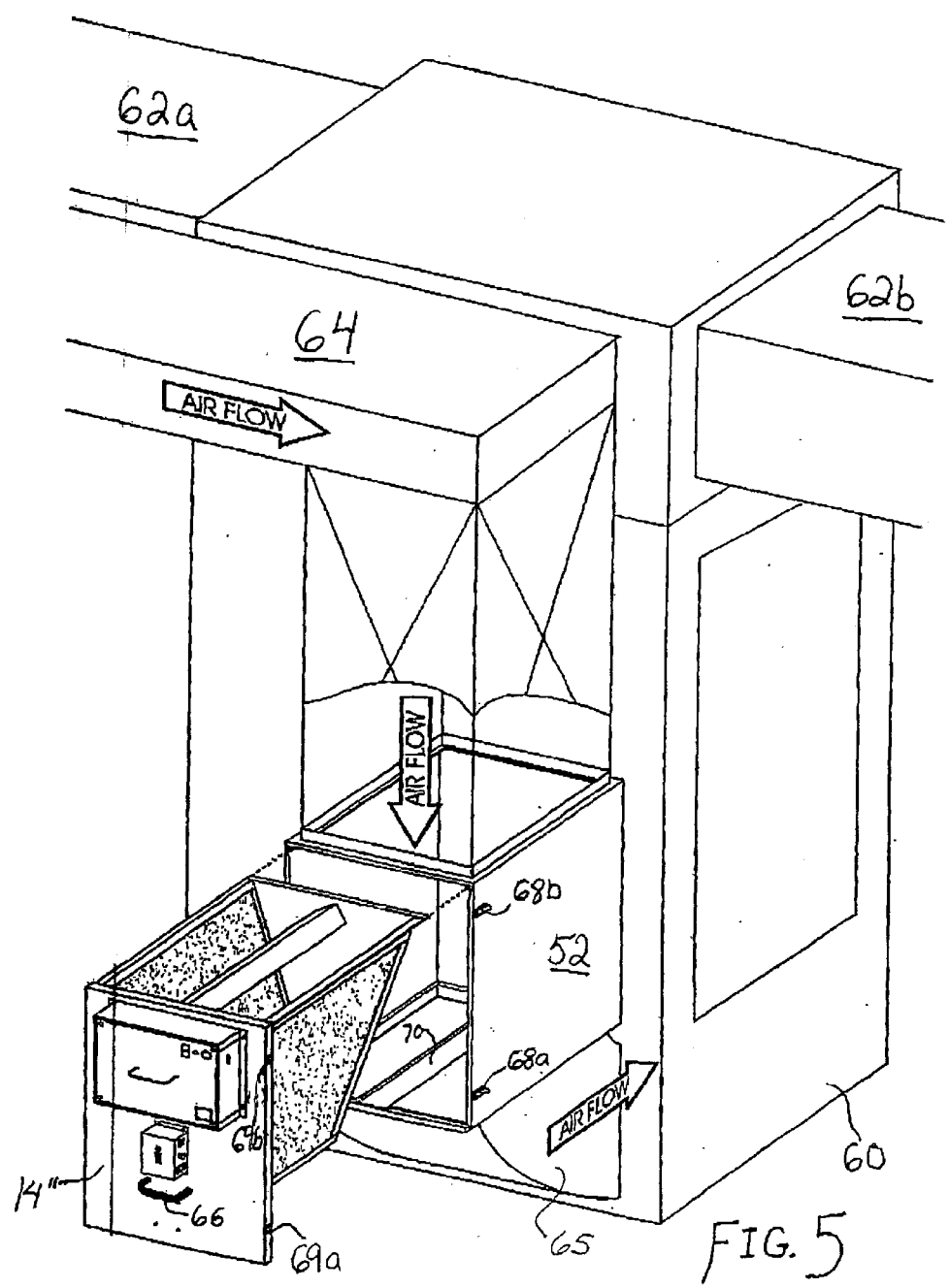
FIG. 5 schematically illustrates a view of the V-shaped filter bank and support structure shown in FIG. 4 in an exemplary installation environment.

As shown in FIG. 5 the V-shaped filter bank 10' may be removed from the housing 52 to a service position in which the filter pads 12a,b can be replaced. In accordance with this embodiment of the invention, a front wall 14' of the integrated air filtration unit 50 is also the front wall 14' of the V-shaped filter bank unit 10'. The front wall 14' is rectangular to mate with the edges of the housing 54.

In an exemplary installation, the integrated air filtration unit 50 shown in FIG. 5 is mounted to a forced-air furnace 60 that forms a part of an air handling system. The air handling system includes hot air ducts 62a,b from which heated air exits the forced-air furnace and is conveyed to heated spaces. The air circulation system further includes a cold air return duct 64 that conveys colder air from the heated spaces, and returns the colder air to the forced-air furnace 60. The housing 52 is provided with appropriate flanges and connectors for facilitating connection of the housing 52 to the cold air return duct 64 and a cold air conduit 65 in fluid communication with a cold air intake of the forced-air furnace 60.

The embodiment of the integrated air filtration unit illustrated in FIG. 5 illustrates further features of the integrated air filtration unit 50. The front wall 14" includes an additional handle 66 for gripping the V-shaped filter bank unit 10', and locking mechanisms 68a,b provided on each side of the housing 52 (only one set is shown). The locking mechanisms 68a,b include latch members pivotally connected to side walls of the housing 52. A t distal ends of the latch members are wire loops for latching to complimentary anchors 69a,b connected to the front wall 14". The locking mechanisms 68a,b facilitate a seal between the front wall 14" and the housing 52, and ensure that the V-shaped filter bank unit 10' does not move from the working position.

The bottom end of the housing 52 preferably includes a support beam 70 that bears at least a portion of a weight of the V-shaped filter bank 10', so that the weight-bearing flanges 23 (FIG. 1) of the V-shaped filter bank 10 do not stress a top end of the housing when it is mounted in an air passage that may lack rigidity.

As will be understood by those skilled in the art, although the invention has been described with reference to embodiments of the invention in which the fibrous air filter pads 12a,b are arranged in V-shaped filter bank pairs, the filter pads may likewise be arranged in "W" configurations for increased filter capacity and reduced air pressure drop.

The embodiments of the invention described above are therefore intended to be exemplary only. The scope of the invention is therefore intended to be limited solely by the scope of the appended claims.

We claim:

1. An integrated air filtration unit comprising:

a substantially V-shaped filter bank having an open top end, a closed bottom end, front and rear walls that are parallel to each other, and at least one pair of air filter pads removably supported between the top and the bottom ends and between the front and the rear walls, thereby defining a space between the filter pads having a substantially triangular cross-section;

a support structure adapted to be mounted in fluid communication with an air passage of an air handling system so that in a working position air moved by the air handling system is passed through the pair of filter pads in either of a first direction in which the air flows through the pair of filter pads to the space between the pair of filter pads, and a second direction in which air flows from the space and through the air of filter pads, the support structure further comprising a pair of side walls and a rear wall, defining an open top end, an open bottom end, and open front side adapted to be closed by the front wall of the V-shaped flute bank; and the support structure being further adapted to slidably support the substantially V-shaped filter bank to permit the V-shaped filter bank to be pulled out of the support structure being to a service position in which the pair of filter pads can be accessed for servicing or replacement.

2. An integrated air filtration unit as claimed in claim 1 wherein the support structure further comprises at least one component of a locking mechanism for releasably locking the substantially V-shaped filter bank in the working position.

3. An integrated air filtration unit as claimed in claim 2 wherein the substantially V-shaped filter bank comprises a pair of flan positioned at opposed sides of the top end and extending laterally and outwardly, the flanges being adapted to be slidably received by the support structure to permit the V-shaped filter bank to be reciprocally moved from the working position to the service position.

4. An integrated air filtration unit as claimed in claim 1 wherein the pair of filter pads are fibrous pads of dielectric material that are supported in frames adapted to electrostatically charge the pair of filter pads.

5. An integrated air filtration unit as claimed in claim 1 wherein the substantially V-shaped filter bank further comprises an ultraviolet irradiation unit mounted to the front wall and extending into the space between the pair of filter pads to expose the respective filter pads to germicidal levels of ultraviolet radiation.

6. An integrated air filtration unit as claimed in claim 5 wherein the ultraviolet irradiation unit is adapted to focus the ultraviolet radiation in a narrow band that is systematically swept over the respective filter pads.

7. An integrated air filtration unit as claimed in claim 6 wherein the ultraviolet irradiation unit comprises:

an elongate frame for supporting an elongate ultraviolet radiation source that extends parallel to the filter pads towards the rear wall of the support structure;

a housing secured to one end of the frame; and a bracket secured to a front surface of the front wall of the support structure for receiving the housing to support the frame when the frame extends into the space through the front wall.

8. An integrated air filtration unit as claimed in claim 1 wherein the support structure comprises:

a housing having an inlet opening and an outlet opening, the housing being adapted to be installed in the air handling system to form a section of the air passage, the substantially V-shaped filter bank being slidably supported within the housing so that air moved through the air passage by the air handling system passes through the pair of filter pads, the housing being adapted to permit the V-shaped filter bank to be moved from the working position to the service position.

9. An integrated air filtration unit as claimed in claim 1 wherein the support structure further comprises a support beam extending between the open front side and the rear wall the beam being connected to a flanged periphery of the open bottom end, for slidably supporting the V-shaped filter bank for movement from the working position to the service position.

10. An integrated air filtration unit comprising:

a substantially V-shaved filter bank having a open top end, a closed bottom end, a front wall and a rear wall that are parallel to each other;

at least one pair of electro-statically charged filter pads removably supported between the open top end and the closed bottom end and between the front and the rear walls, thereby defining a space between the filter pads that is substantially triangular in cross-section;

an ultraviolet irradiation unit mounted to the front wall and extending into the space defined between the pair of filter pads to irradiate the respective electro-statically chained filter pads with germicidal levels of ultraviolet radiation;

a housing having an inlet opening and outlet opening, the housing being adapted to be installed in the air handling system to form a section of an air passage, the substantially V-shaped filter bank being slidably supported within the housing so that air moved through the air passage by the air handling system passes through the at least one pair of filter pads, the housing being adapted to permit the V-shaped filter bank to be moved from the working position to the service position, the housing further comprising a pair of side walls and a rear wall, with an open top end, an open bottom end, and an open front side adapted to be closed by the front wall of the V-shaped filter bank.

11. An integrated air filtration unit as claimed in claim 10 wherein the ultraviolet irradiation unit is adapted to focus the ultraviolet radiation in a narrow band that is systematically swept over the respective electro-statically charged filter pads.

12. An integrated air filtration unit as claimed in claim 11 wherein the ultraviolet irradiation unit comprises:

an elongate frame for supporting an elongate ultraviolet radiation source that extends from the front wall between the pair of electro-statically charged filter pads;

a housing secured to one end of the frame; and a support bracket secured to a front surface of the front wall for receiving the housing to support the frame when the frame is inserted into the space between the pair of electro-statically charged filter pads.

13. An integrated air filtration unit as claimed in claim 12 further comprising a support structure adapted to be affixed to an air passage of an air handling system, the support structure supporting the substantially V-shaped filter bank in a working position in which air moved through the air passage by the air handling system is drawn through the pair of electro-statically charged filter pads, while permitting the V-shaped filter bank to be moved to a service position in which the electro-statically charged filter pads are accessible for maintenance or replacement.

14. An integrated air filtration unit as claimed in claim 13 wherein the support structure comprises a locking mechanism for releasably locking the substantially V-shaped filter bank in the working position.

15. An integrated air filtration unit as claimed in claim 14 wherein the locking mechanisms comprise latches adapted to retain the V-shaped filter bank in the working position, the latches being releasable to permit the substantially V-shaped filter bank to be pulled out of a mounting rack to the service position.

16. An integrated air filtration unit as claimed in claim 10 wherein the housing further comprises a supporting beam that extends between the open front side and the rear wall, the beam being connected to a periphery of the open bottom end, the supporting beam slidably supporting the V-shaped filter bank for movement from the working position to the service position.

* * * * *